United States Patent [19]

Schuitmaker et al.

[11] Patent Number: 4,607,361
[45] Date of Patent: Aug. 19, 1986

[54] RECORD PLAYER HAVING A LOADING MECHANISM FOR LOADING A DISK

[75] Inventors: Pieter D. Schuitmaker; Wilhelmus P. C. Rietbergen, both of Eindhoven, Netherlands

[73] Assignee: U.S. Philips Corporation, New York, N.Y.

[21] Appl. No.: 766,666

[22] Filed: Aug. 15, 1985

Related U.S. Application Data

[63] Continuation of Ser. No. 544,045, Oct. 24, 1983, abandoned.

[30] Foreign Application Priority Data

Jun. 15, 1983 [NL] Netherlands .......................... 8302131

[51] Int. Cl.$^4$ ...................... G11B 17/04; G11B 17/26
[52] U.S. Cl. .................................. 369/75.2; 369/77.1; 369/270
[58] Field of Search ...................... 369/75.2, 77.1, 270, 369/271

[56] References Cited

U.S. PATENT DOCUMENTS 4,272,794  6/1981  Skarky .................. 369/75.2
4,337,533  6/1982  Ando et al. ............ 369/271
4,347,596  8/1982  Abe et al. .............. 369/75.2

FOREIGN PATENT DOCUMENTS 56-58167  5/1981  Japan .................. 369/75.2

*Primary Examiner*—Steven L. Stephan
*Attorney, Agent, or Firm*—David R. Treacy

[57] ABSTRACT

In a record player having a loading mechanism for loading a disk (30), a rectilinearly retractable and extensible drawer (6) is provided, which carries a platform (15) and a pivotable pressure lever (24) with a disk loader (29). The drawer (6) has in side walls (9,10) grooves (14), in which the platform (15) is movable between an upper and a lower position in the direction of height with respect to the drawer, whereby the platform (15) in the lower position is located below the upper side of the turn-table (21). The platform (15) is held during a first part of the sliding-in movement by at least one positioning member (17) in the upper position in the grooves and is pressed during a second part of the sliding-in movement against at least one abutment stop (26), as a result of which it performs a substantially vertical movement with respect to the turn-table (21) in the grooves (14) to the lower position. The pressure lever (24) is engaged during the movement in the grooves (14) with the platform (15) and is pivoted in downward direction.

10 Claims, 4 Drawing Figures

RECORD PLAYER HAVING A LOADING MECHANISM FOR LOADING A DISK

This is a continuation of application Ser. No. 544,045 filed Oct. 24, 1983 now abandoned.

BACKGROUND OF THE INVENTION

The invention relates to a record player having a front loading mechanism for loading a disk. Such a player has a housing and a frame fixed within the housing in which a turn table is rotatably journalled about a vertical axis loading mechanism comprises a drawer which is rectilinearly slidable inward and outward through a front opening in the housing, between an opened (extended) and a closed (retracted) position. The drawer carries a platform for carrying a disk to the turn table. The loading mechanism further comprises a pressure lever with a disk loader pivotable in a generally vertical direction about a shaft at right angles to the sliding direction of the drawer.

A known record player of this kind is the record player of the Japanese firm Sony, type CDP-101. Such a record player is intended to play optically readable audio disks of the "Compact Disc" type. In this player, a complicated lifting device comprising a plurality of cams is provided in the platform, which device causes the disk to be lowered on the turn-table after the platform has been moved above the turn-table. For the control of the various movements of the drawer, the platform and the lifting device, the loading mechanism of the known record player is provided with various driving mechanisms, such as electric motors, and with control electronics, as a result of which the construction of the loading mechanism of the known record player is complicated and voluminous.

SUMMARY OF THE INVENTION

The invention has for its object to provide the record player of this kind having a simple, compact mechanically operating loading mechanism.

According to the invention, a record player has grooves in side walls of the drawer, sloping obliquely upward toward the rear of the drawer. The platform engages the grooves, and generally vertically is movable in the grooves with respect to the drawer between an upper and a lower position in a generally vertical direction. In the lower position the platform is located below the upper side of the turn-table. During a first part of the drawer inward movement the platform is held in the upper position in the grooves by at least one positioning member. During a second part of the inward movement the platform presses against at least one abutment stop and performs a substantially vertical movement with respect to the turn table in the grooves to the lower position. During this movement in the grooves the pressure lever is engaged by the platform and is pivoted in a downward direction. Thus, a purely mechanically operating loading mechanism, which comprises a small number of component parts, is obtained, in which in a reliable manner a control of the platform and the pressure lever with respect to the turn-table is obtained by means of the grooves, the positioning member and the abutment stop. Due to the small number of component parts, the drawer can be of compact construction and have a small width and height. This small frontal area is advantageous with respect to the construction of the front part of the housing of the record player, because a lot of space becomes available for operating keys and other members present on the front part due to the small dimensions of the front opening of the drawer.

A preferred embodiment of a record player according to the invention is characterized in that the abutment stop is constituted by a projection formed on the pressure lever, and the platform is provided with a hook which during the second part of the drawer inward movement engages the projection. Thus, two functions are united in the abutment stop: the control of the platform in the grooves, and the step of causing the disk loader to move downwards. As a result, it can be ensured that the relative directions of movement of the platform and the pressure lever match accurately.

In a still further preferred embodiment the positioning member is constituted by a spring, whose ends are connected to the platform and the drawer, respectively, and which during the first part of the outward movement of the drawer causes the platform to move to the upper position in the grooves. In this manner, a positioning member is obtained which on the one hand holds the platform in the upper position in a reliable manner during the first part of the drawer inward movement and which on the other hand causes the platform to move in an effective manner from the lower position back to the upper position at the end of the first part of the outward movement of the drawer.

Yet another preferred embodiment according to the invention is characterized in that, after the pressure lever has been disengaged from the platform, it is positioned upwardly against at least one abutment so that it can be engaged again by the hook on the platform during the next second part of the inward movement of the drawer. Thus, during the first part of the inward movement of the drawer the pressure lever with the abutment stop is in the correct position to again engage with the platform.

The invention will be described more fully with reference to an embodiment of a record player according to the invention, which is shown in the drawing, but to which the invention is not limited.

DESCRIPTION OF THE PREFERRED EMBODIMENT

Figure 1:
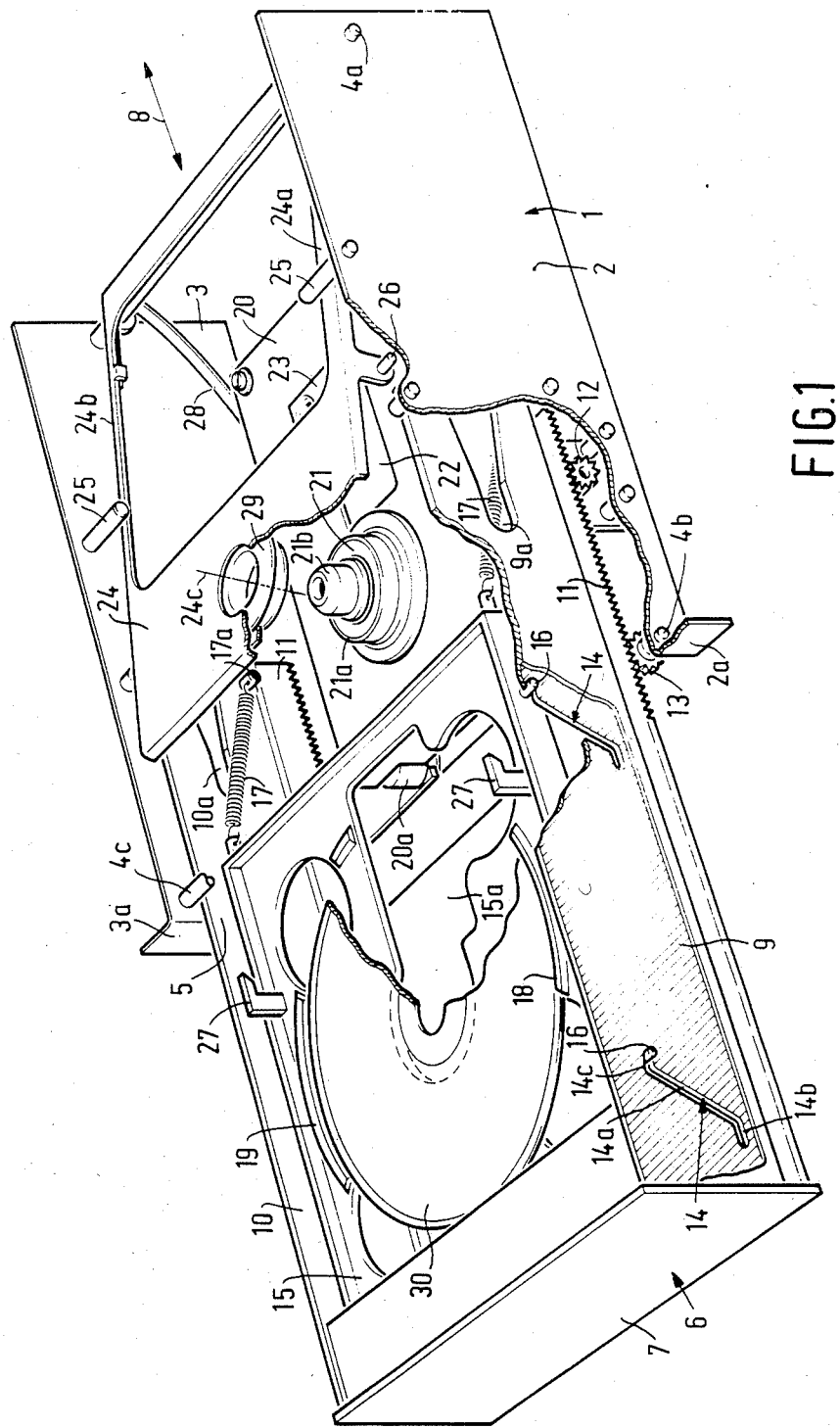
FIG. 1 is a partly cut-away perspective view of a record player according to the invention, in which the drawer is in the extended position.

The record player shown in FIG. 1 comprises a housing 1 with upright side walls 2 and 3 which are connected near the front to rectangularly bent front walls 2a and 3a, respectively. The side walls 2 and 3 are interconnected via three connection rods 4a, 4b, and 4c, as a result of which the housing has the required rigidity. Between the front walls 2a and 3a and the rods 4b and 4c, a front opening 5 is provided in the housing 1, through which a drawer 6 can be rectilinearly slid inward and outward.

Figure 3:
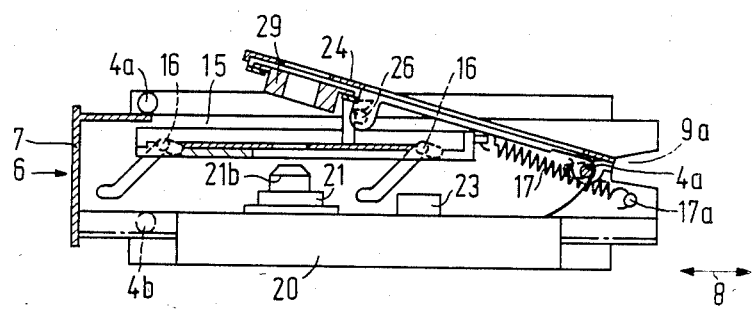
FIG. 3 is a side elevation of the parts shown in FIG. 2, in which the drawer is at the beginning of the second part of the inward movement.
Figure 4:
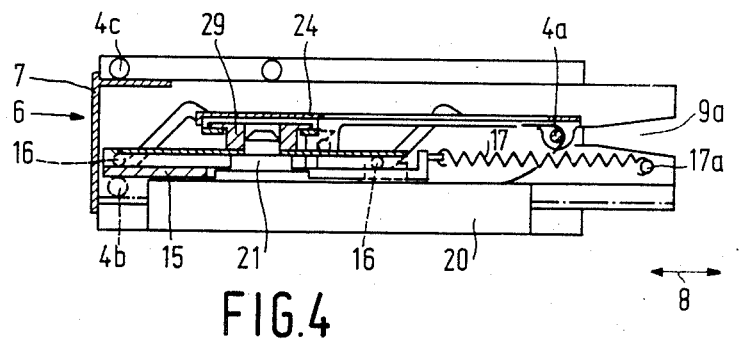
FIG. 4 is a side elevation of the parts of the record player, in which the drawer is fully retracted.

The drawer 6 has a front flap 7 which, after the drawer has slid to the closed position shown in FIG. 4, covers the front opening 5. The sliding direction of the drawer is indicated in the Figures by the double arrow 8. The front flap 7 is connected to upright slide walls 9 and 10 of the drawer 6, which are each provided on the lower side with a rack 11 engaging a pinion 12 which are coupled to a driving motor in a manner not shown. Further, near the front side on the connection rod 4b another pair of pinions 13 engage the rack 11 to ensure stable guiding of the drawer. Alternatively the sliding of the drawer may also be effected purely automatically, in which event the connection rod 4b is enclosed by a torsion spring, which is stretched when the drawer is retracted (closed) and is relieved when the drawer is extended (opened). In this case, a locking mechanism not shown ensures that the drawer is locked in the closed position. The pinions 12 may be provided with a damping coupling for damping the outward movement of the drawer 6. The side walls 9 and 10 are provided near the rearmost ends with recesses 9a and 10a, respectively, which, as is shown in FIGS. 3 and 4, permit movement of the walls along the connection rod 4a during the second part of the sliding-in movement.

The facing sides of the side walls 9 and 10 are provided with pairs of grooves 14, which are parallel to each other. The grooves 14 each comprise a main part 14a extending in the forward or outer direction obliquely downwards and continuing on the lower side into an end part 14b extending substantially horizontally. An upper end part 14c of each groove extends from the main part 14a obliquely downwards in rearward direction.

Figure 2:
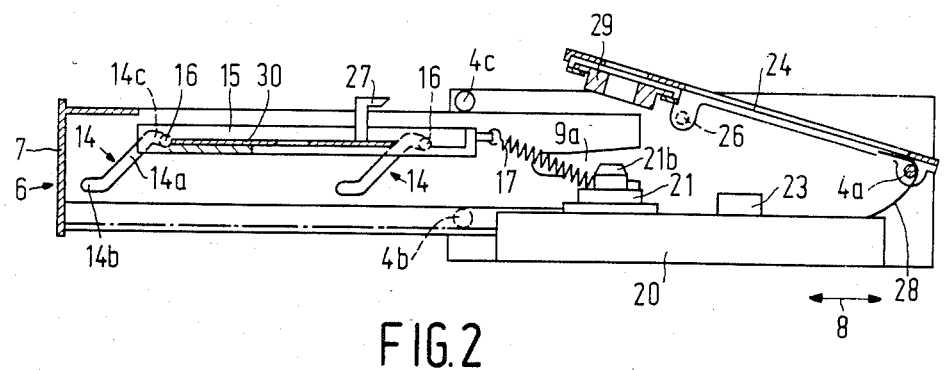
FIG. 2 shows on a reduced scale a side elevation of parts of the recorded player in the position shown in FIG. 1.

The drawer 6 carries a platform 15 which is guided in the grooves 14 by means of projections constituted by pins 16. In the extended position shown in FIGS. 1 and 2, the pins 16 are positioned in the ends of the end parts 14c under the influence of tension springs 17, which are stretched between the rear of the platform 15 and supports 17a located near the rearmost ends of the side walls 9 and 10. Thus, the springs 17 act as positioning means to hold the platform 15 in a stable manner in the upper position. At its upper side, the platform 15 has a disc carrying surface which, near the sides adjoining the side walls 9 and 10, is limited by positioning edges 18 and 19 with conically extending inner walls intended for centering a disk 30 while it is on the platform 15. The platform is provided with a number of openings, of which an opening 15a has a particular function.

By means of rubber feet 20a, a frame 20 is supported elastically inside the housing 1. The frame 20 carries a turn table 21 which is rotatably journalled therein and is driven by a driving motor below the frame 20 in a manner not shown. The turntable 21 has a disc aligning edge 21a near the disc circumference and a centering cone 21b near the upper side. The frame 20 is further provided with a recess 22 which extends in a radial direction with respect to the turn-table 21 and in which a lift-pin unit 23 is movable in radial direction when playing the record.

The connection rod 4a at the same time constitutes a pivot shaft for a pressure lever 24, which has limbs 24a and 24b. In the position shown in FIGS. 1 and 2 these limbs engage abutments constituted by pins 25, which are connected to the side walls 2 and 3, respectively, of the housing, as a result of which the pressure lever is positioned in the upward direction. Further, the limbs 24a and 24b are provided with bent tabs which each carry a projection constituted by a pin 26. The pins 26 constitute abutment stops. After the first part of the inward movement, during which the disk 30 moves as far as a position above the turntable without hindrance, hooks 27 provided on the upper side of the platform 15 abut against the pins 26, and these hooks then engage the pins 26. After this engagement, the effect of the springs 17 no longer holds the pins 16 against the rear ends of the groove end part 14c. As a result the pins 16 move from the upper position through the grooves 14 to the lower position.

At the instant at which the hooks 27 engage the pins 26, the platform 15 has arrived at the correct place above the turntable 21. During the second part of the inward movement, when the platform 15 is lowered, the pressure lever 24 is pivoted by the hooks 27 against the action of leaf springs 28 in a downward direction about the pivot shaft 4a. The upper side of the platform 15 moves to a position below the upper side of the turn table 21. During this movement, the disk 30 is centered on the centering cone 21b and the disk is disposed on the turn table 21 free from the platform 15. During the next part of the movement of the pins 16 in the main parts 14a of the grooves 14, the platform is moved to a lower position and the pressure lever 24 is pivoted further, after which a disk loader 29 carried by the main part 24c of the lever 24 urges the disk against the turn table 21. At the end of the movement, the platform 15 is positioned with the pins 16 in a stable manner on the end of the end parts 14b.

For opening the drawer, a key (not shown) on the housing 1 is depressed, after which the drive operates in the opposite direction and causes the drawer 6 to move outwards. First the platform 15 moves upwards substantially in a vertical direction with respect to the turn-table 21, and the disk loader 29 is pivoted upwards due to the engagement with the hooks 27. The platform vertical movement is due to the presence of tension springs 17, which urge the platform rearward and cause the pins 16 to move upwards again in the grooves 14 under the influence of the leaf-springs 28 which endeavour to pivot the pressure lever 24 upwards. At the end of the pivotal movement, the limbs 24a and 24b of the pressure lever 24 again engage the pins 25. As a result, after disengagement from the hooks 27 during the second part of the outward movement of the drawer 6, the pins 26 are positioned again for a next inward movement of the drawer so as to engage the hooks again. At the end of the first part of the outward movement, the platform 15 is again positioned with the pins 16 in a stable manner in the end parts 14c of the grooves 14. At the end of the outward movement, due to the presence of the aforementioned openings in the platform 15 it is easy to pick up the disk with the peripheral edge between thumb and forefinger and to remove it and to dispose a new disk on the platform, respectively.

The loading mechanism comprising the drawer 6, the platform 15 and the pressure lever 24 ensures that a disk to be loaded is slid in along an accurately defined path and moves to the turn-table in the correct position in a substantially vertical direction. The described construction of a loading mechanism for a record player has the advantage that it can be compact and simple, while the various movements are performed purely mechanically. The described loading mechanism is particularly suitable for the use in record players for reading optical audio-disks of the "compact disc" type, which record players are suitable, due to the introduction of the disk in horizontal position through a front opening in the housing, to be included in a stacked collection of audio apparatus or in a space strongly limited in the vertical direction, for example, between two book-shelves.

What is claimed is:

1. A record player having a loading mechanism for loading a disc, comprising:
   a housing,
   a frame fixed within said housing,
   a turntable having an upper side and being rotatably journalled within said frame about a vertical axis, and
   a loading mechanism comprising a drawer having opposed side walls, a platform carried on said drawer for carrying a disc to the turntable, and a pressure lever having a disc loader for pressing a disc against the turntable, said drawer being rectilinearly moveable in a horizontal direction inwardly from an opened position to a closed position and outwardly from said closed position to said opened position, said drawer's inward movement having successive first and second stages,
   characterized in that each of said drawer side walls has a groove sloping obliquely upwardly in the direction of the drawer's inward movement,
   said platform includes means engaging said grooves for guiding the platform in reversible movement between an upper position and a lower position, in said lower position said platform being positioned below the turntable's upper side, and
   said pressure lever is pivoted about a horizontal axis perpendicular to the direction of movement of the drawer,
   said mechanism further comprises (a) at least one positioning member arranged for holding said platform in said upper position during said first stage of the drawer's inward movement,
   (b) an abutment stop formed as a projection on said pressure lever arranged to engage said platform during said second stage of said inward movement so as to block further inward movement of the platform and cause the platform to move, with respect to said grooves, to said lower position, and
   (c) hook means on said platform for engaging said abutment stop and pivoting said pressure lever in a generally downward direction during the downward movement of the platform with respect to said grooves.

2. A player as claimed in claim 1, characterized in that said positioning member is a tension spring having respective ends connected to the platform and to the drawer, arranged so as to urge the platform with respect to the drawer in the direction of inward movement of the drawer, during a first part of the outward movement of the drawer said spring causing said platform to move upwardly by engagement with and movement along said grooves.

3. A player as claimed in claim 2, characterized in that each side wall has two said grooves having corresponding groove parts parallel to each other, and said means engaging said grooves comprise respective pins projecting from the platform transversely to the direction of drawer movement and engaging respective grooves.

4. A player as claimed in claim 3, characterized in that said hook is fixed to said platform, and the projection forming the abutment stop includes a laterally extending pin arranged for engagement by said hook, the player further including means for biasing said pressure lever in an upward direction, and an abutment stop arranged to hold said pressure lever in an upward position after disengagement from the platform, said projection so situated that during a next inward movement of the drawer the lever's projection will again be engaged by said hook on said platform.

5. A player as claimed in claim 1, characterized in that each side wall has two said grooves having corresponding groove parts parallel to each other, and said means engaging said grooves comprise respective pins projecting from the platform transversely to the direction of drawer movement and engaging respective grooves.

6. A player as claimed in claim 5, characterized in that said hook is fixed to said platform, and the projection forming the abutment stop includes a laterally extending pin arranged for engagement by said hook, the player further including means for biasing said pressure lever in an upward direction, and a second abutment stop arranged to hold said pressure lever in an upward position after disengagement from the platform, said second stop so arranged that during a next inward movement of the drawer in the lever's pin will again be engaged by said hook on said platform.

7. A record player having a loading mechanism for loading a disc, comprising:
   a housing,
   a frame fixed within said housing,
   a turntable having an upper side and being rotatably journalled within said frame about a vertical axis, and
   a loading mechanism comprising a drawer having opposed side walls, a platform carried on said drawer for carrying a disc to the turntable, and a pressure lever having a disc loader for pressing a disc against the turntable, said drawer being rectilinearly moveable in a horizontal direction inwardly from an opened position to a closed position and outwardly from said closed position to said opened position, said drawer's inward movement having successive first and second stages,
   characterized in that each of said drawer side walls has a groove sloping obliquely upwardly in the direction of the drawer's inward movement,
   said platform includes means engaging said grooves for guiding the platform in reversible movement between an upper position and a lower position, in said lower position said platform being positioned below the turntable's upper side, and
   said mechanism further comprises (a) at least one positioning member arranged for releasably maintaining said platform in said upper position during said first stage of the drawer's inward movement,
   (b) an abutment stop on said pressure lever arranged to engage said platform during said second stage of said inward movement so as to block further inward movement of the platform, thus causing the platform to move, with respect to said grooves, to said lower position, and
   (c) means on said platform for engaging said abutment stop and pivoting said pressure lever in a generally downward direction during the downward movement of the platform with respect to said grooves.

8. A record player having a loading mechanism for loading a disc, comprising:
   a housing a frame fixed within said housing, a turntable having an upper side and being rotatably journalled within said frame about a vertical axis, and a loading mechanism comprising a drawer having opposed side walls, a platform carried on said drawer for carrying a disc to the turntable, and a pressure lever having a disc loader for pressing a disc against the turntable, said drawer being moveable in a horizontal direction inwardly from an opened position to a closed position and outwardly from said closed position to said opened position, said drawer's inward movement having successive first and second stages, characterized in that each of said drawer side walls has a groove sloping obliquely upwardly in the direction of the drawer's inward movement, said platform includes means engaging said grooves for guiding the platform in reversible movement between an upper position and a lower position, in said lower position said platform being positioned below the turntable's upper side, and said mechanism further comprises (a) at least one positioning member mounted on said frame for engaging and releasably maintaining said platform in said upper position during said first stage of the drawer's inward movement, and (b) a single set of stop and engaging elements mounted on said platform and pressure lever respectively, one of said elements engaging the other during said second stage of said inward movement for both stopping said inward movement of said platform and driving said pressure lever to pivot downward during said downward movement of the platform with respect to said groove.

9. A record player according to claim 8 wherein said set of elements comprises a hook on said platform and an abutment stop on said pressure lever.

10. A record player according to claim 8 wherein said positioning member comprises a tension spring having one part secured to said frame and a second part secured to said platform.

* * * * *